Patented Apr. 18, 1933

1,904,545

UNITED STATES PATENT OFFICE

KARL SCHÖLLKOPF, OF DUSSELDORF-OBERKASSEL, AND ARTHUR SERINI, OF DUSSELDORF-HEERDT, GERMANY, ASSIGNORS TO RHEINISCHE KAMPFER-FABRIK GESELLSCHAFT MIT BESCHRÄNKTER HAFTUNG, OF DUSSELDORF-OBERKASSEL, GERMANY

PROCESS FOR PREPARING PURE OPTICALLY INACTIVE MENTHOL

No Drawing. Application filed January 3, 1930, Serial No. 418,432, and in Germany January 28, 1929.

The hitherto known processes for preparing pure optically inactive menthol consists either in esterifying the menthol mixtures obtained by hydrogenating thymol or inactive menthones or menthenones with the equivalent quantity or a slight excess of phthalic anhydride and separating the esters formed from one another by fractional crystallization (vide Pickard and Littlebury, Journal of the Chemical Society, vol. 101, pages 109 et seq.) or, alternatively, in subjecting the said hydrogenation products to a preliminary physical purification and then subjecting only the fraction rich in menthol of the original hydrogenation product to complete esterification and purifying the resulting crystalline ester by recrystallization (vide French Patent No. 627,694 and U. S. A. Patent No. 1,672,346). The first process has the disadvantage that it necessitates a very large number of crystallizations of the esters, and consequently involves a correspondingly very considerable diminution in yield. The second process necessitates a preliminary purification process in order to ensure a technically serviceable yield of esters.

According to this invention it has been found that it is possible to effect the separation of pure inactive menthol from menthol mixtures, for instance from the hydrogenation products indicated above or from isomerization products of isomeric menthols, in one operation by esterifying such menthol mixtures with an acid anhydride or an acid chloride in an amount insufficient for complete esterification instead of with an equivalent amount, so that only a partial esterification takes place. The corresponding menthol esters can then be directly crystallized from the esterification product and be readily obtained pure by further recrystallization.

The following examples serve to illustrate how the invention may be carried into effect.

1. 100 parts of thymol are hydrogenated with 5 parts of nickel catalyst at 180° C. and the resulting menthol mixture of melting point 15° C. is heated with 70 parts of phthalic anhydride to 120° C. for 3 hours with stirring. The resulting melt is then introduced into an excess of aqueous sodium carbonate solution and distilled with steam, whereby 30 parts of the menthol mixture, consisting chiefly of neomenthol, are removed. The residual sodium carbonate solution is acidified, the precipitated ester separated and recrystallized twice from alcohol, and the resulting pure ester saponified. The yield of pure menthol calculated on the hydrogenation product amounts to about 35%. The unesterified menthol fractions and the menthol mixtures recovered by means of saponification from the mother liquors of the ester crystallizations may be employed in known manner for obtaining further quantities of pure inactive menthol.

2. 100 parts of inactive neo-menthol are heated with 5 parts of sodium to 180° C. for about 24 hours. The isomerization product is then subjected to steam distillation and the resulting menthol mixture esterified for 3 hours at 120° C. with 80 parts of phthalic anhydride. 50 parts of alcohol are added to the melt whilst still hot. On cooling the acid phthalic acid ester of the inactive menthol crystallizes out. After twice recrystallizing this ester from alcohol the pure ester is obtained, which, on saponification, yields pure menthol. The yield of pure menthol, calculated on the neo-menthol employed, amounts to about 40%.

We claim:—

1. A process for preparing pure optically inactive menthol by subjecting a mixture of inactive menthol with its isomers to a partial i. e. selective esterification by treating such mixture with materials for esterifying in an amount insufficient for complete esterification of the mixture, purifying the resulting menthol esters by recrystallization and finally saponifying the pure esters.

2. A process for preparing pure optically inactive menthol by subjecting a mixture of inactive menthol with its isomers to a partial i. e. selective esterification by treating such mixture with an acid anhydride in an amount insufficient for complete esterification of the mixture, purifying the resulting menthol esters by recrystallization and finally saponifying the pure esters.

3. A process for preparing pure optically inactive menthol by subjecting the hydrogenation products of thymol to a partial i. e. selective esterification, purifying the resulting menthol esters by recrystallization and finally saponifying the pure esters.

4. A process for preparing pure optically inactive menthol by subjecting the hydrogenation products of inactive menthones to a partial i. e. selective esterification, purifying the resulting menthol esters by recrystallization and finally saponifying the pure esters.

5. A process for preparing pure optically inactive menthol by subjecting the hydrogenation products of inactive menthenones to a partial i. e. selective esterification, purifying the resulting menthol esters by recrystallization and finally saponifying the pure esters.

6. A process for preparing pure optically inactive menthol by subjecting the isomerization products of inactive isomeric menthols to a partial i. e. selective esterification, purifying the resulting menthol esters by recrystallization and finally saponifying the pure esters.

7. A process for preparing pure optically inactive menthol by subjecting the isomerization products of inactive isomeric menthols to a selective esterification by treating such mixtures with an acid anhydride sufficient in amount to provide esterification of the isomeric menthols having the greater speed of esterification, purifying the resulting menthol esters by recrystallization and finally saponifying the pure esters.

In testimony whereof we have hereunto affixed our signatures this 18th day of December, 1929.

KARL SCHÖLLKOPF.
ARTHUR SERINI.